United States Patent
Jog

(10) Patent No.: US 11,675,876 B2
(45) Date of Patent: Jun. 13, 2023

(54) TRAINING ROBUST MACHINE LEARNING MODELS

(71) Applicant: International Business Machines Corporation, Armonk, NY (US)

(72) Inventor: Amod Jog, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 17/082,060

(22) Filed: Oct. 28, 2020

(65) Prior Publication Data

US 2022/0129697 A1    Apr. 28, 2022

(51) Int. Cl.
   *G06T 7/00* (2017.01)
   *G06F 18/2135* (2023.01)

(52) U.S. Cl.
   CPC ........ *G06F 18/2135* (2023.01); *G06T 7/0012* (2013.01); *G06T 2207/20081* (2013.01); *G06T 2207/20084* (2013.01); *G06V 2201/03* (2022.01)

(58) Field of Classification Search
   CPC ................ G06K 9/6247; G06T 7/0012; G06T 2207/20081; G06T 2207/20084; G06V 2201/03
   USPC ......................................................... 382/156
   See application file for complete search history.

(56) References Cited

U.S. PATENT DOCUMENTS

| | | | | |
|---|---|---|---|---|
| 2008/0317350 | A1* | 12/2008 | Yamaguchi | G06V 40/172 382/118 |
| 2011/0249001 | A1* | 10/2011 | Kameyama | G06F 17/16 345/428 |
| 2015/0213302 | A1* | 7/2015 | Madabhushi | G06T 7/0012 382/133 |
| 2019/0122097 | A1* | 4/2019 | Shibahara | G06N 3/063 |
| 2019/0347571 | A1* | 11/2019 | Qadir | G06N 20/00 |
| 2020/0184259 | A1* | 6/2020 | Viswanathan | G06F 18/22 |
| 2020/0311548 | A1* | 10/2020 | Shrivastava | G06F 17/15 |
| 2020/0372362 | A1* | 11/2020 | Kim | G06N 3/04 |

FOREIGN PATENT DOCUMENTS

| | | |
|---|---|---|
| CN | 106529402 A | 3/2017 |
| CN | 106682734 A | 5/2017 |
| CN | 105160400 B | 3/2018 |
| CN | 108182394 A | 6/2018 |
| CN | 108596274 A | 9/2018 |
| CN | 105469041 B | 5/2019 |
| CN | 110516561 A | 11/2019 |
| CN | 110599448 A | 12/2019 |

OTHER PUBLICATIONS

Ganin et al., "Unsupervised Domain Adaptation by Backpropagation", Proceedings of the 32nd International Conference on Machine Learning, Lille, France, 2015, JMLR: W&CP vol. 37, 10 pages.

Mell et al., "The NIST Definition of Cloud Computing", Recommendations of the National Institute of Standards and Technology, Special Publication 800-145, Sep. 2011, 7 pages.

Sun et al., "Return of Frustratingly Easy Domain Adaptation", arXiv:1511.05547v2 [cs.CV] Dec. 9, 2015, 8 pages.

* cited by examiner

*Primary Examiner* — Van D Huynh

(74) *Attorney, Agent, or Firm* — David K. Mattheis

(57) ABSTRACT

Training a robust machine learning model by mapping an input data set to a first feature space, applying a transformation to the first feature space, yielding a second feature space, and training a dense model using the first feature space, and the second feature space.

20 Claims, 6 Drawing Sheets

TRAINING ROBUST MACHINE LEARNING MODELS

BACKGROUND

The disclosure relates generally to training robust machine learning models. The disclosure relates particularly to training convolutional neural networks plus deep classification models to be robust to differences between training and test data.

Deep learning models, such as convolutional neural networks plus classification models, may be trained to classify an input image. For example, a deep learning model may be trained to classify a mammogram image as negative (cancer free), benign, or malignant. The expectation for such models is that the models deliver consistent results regardless of the scanning site equipment used in obtaining the input image.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable training robust machine learning models.

Aspects of the invention disclose methods, systems and computer readable media associated with training a robust machine learning model by mapping an input data set to a first feature space, applying a transformation to the first feature space, yielding a second feature space, and training a dense model using the first feature space, and the second feature space.

Aspects of the invention disclose methods, systems and computer readable media associated with training a robust machine learning model by mapping input images to a feature set in an original feature space, applying multiple random transformations to the original feature set of the original feature space yielding a set of transformed features, and using the original feature set and the transformed feature set to train a classifying dense model that produces the final label.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
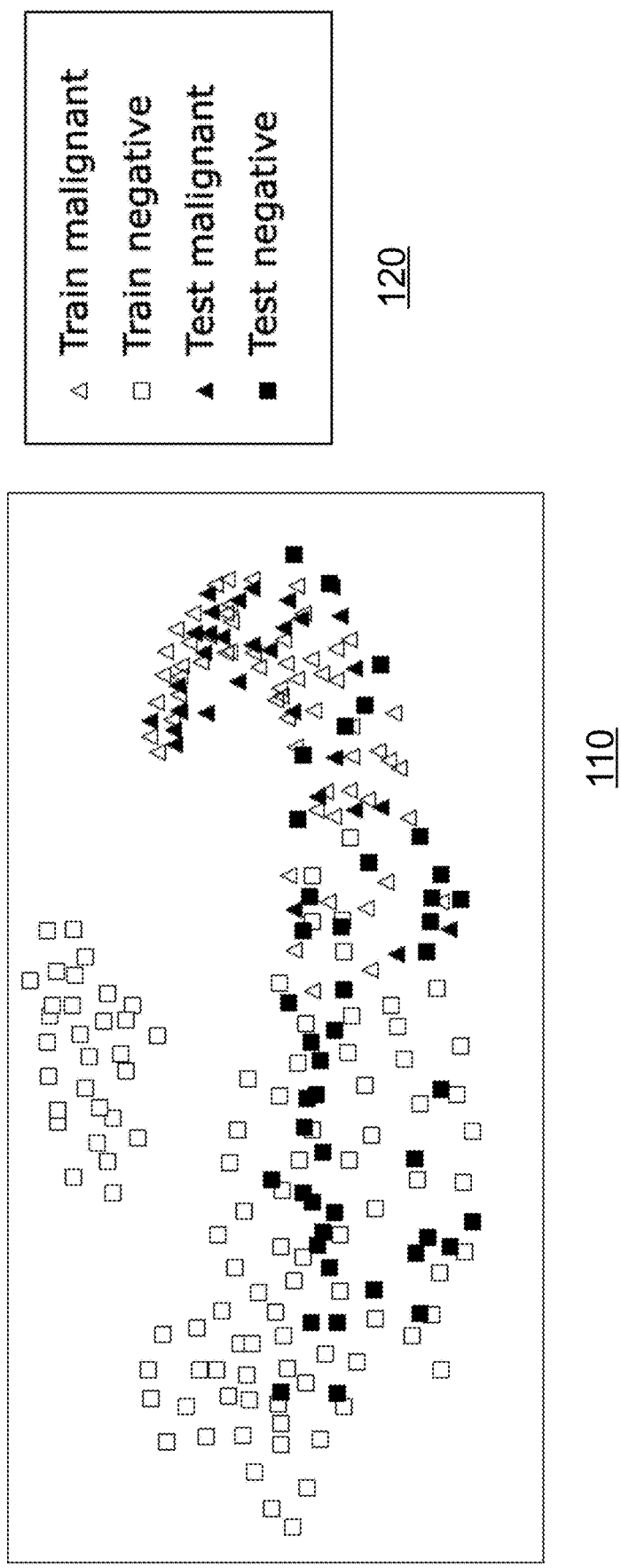
FIG. 1 depicts the original feature space distribution, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., mapping an input data set to a feature space, transforming the feature space, training a dense model using the original and transformed feature spaces, etc.). These solutions are not abstract and cannot be performed as a set of mental acts by a human due to the processing capabilities needed to facilitate robust model training, for example. Further, some of the processes performed may be performed by a specialized computer for carrying out defined tasks related to training machine learning models. For example, a specialized computer can be employed to carry out tasks related to training a robust classification model, or the like.

Machine learning models, including convolutional neural networks (CNN), typically have millions of parameters that need to be learned for acceptable classification performance. However, training on a limited training data set can result in overfitting the model to the training set and can reduce the classification performance on an unseen test data set. For example, a model trained using mammogram images from a set of mammogram imaging centers may become overfitted to images from that set of imaging centers and may suffer poor prediction results for imaging centers outside that set. It is not practical to train a model using training data from all possible test data sources, such as all possible mammogram imaging centers.

Training data augmentation is one of the many techniques used to train a CNN to be robust to test data variations that might not be present in the training set. Augmentations include geometrical transformations such as rotations, flips, or deformable transforms, and intensity transformations such as scaling, histogram matching etc. The existing training data samples are randomly transformed and introduced during the model training epochs with the same label as the original untransformed samples to force the network model to learn to predict the same label despite the transformations in the sample. For example, the set of mammogram images may be transformed as described above. For the example, both the original and transformed images may be utilized in training the classification model. Due to the high number of parameters in the CNN, it can learn to map both the transformed and untransformed samples to the same label thereby learning to be robust to the transformation.

Trained CNN layers produce a flattened feature space from the input data. The feature space is considered to be flattened as the processing by the model, such as a CNN, reduces the dimensionality of the feature set of the input data, for example reducing the dimensionality of the space describing the data set from millions of features to thousands of features. The relatively low dimensional flattened feature space serves as the input to a dense model of one or more fully connected layers which become trained as a sample classifier using the labeled samples of the input training data set of samples. The CNN learns to map labeled input samples (e.g., mammogram images) to the relatively low dimensional feature space using the training data samples, and to classify the samples using the classifier of the dense, fully connected model layers.

Training the model using an augmented training data set increases the time and computing resources necessary to for the training and may still yield a model overfitted to the now augmented training data set. Differences between training data samples and test data may arise from the origin of the respective samples, e.g., testing equipment used to acquire images, or other difference associated with the acquisition of the samples. These differences may result in test data features which are not well aligned with the feature space mapped from the labeled training data. The decision boundaries learned from the mapping of the training data set may not be applicable to the test data samples, resulting on poor classification results, e.g., false negatives, false positives, etc.

The feature space mapping of test data samples may differ from the feature space mapping of the training data samples according to a linear transformation. (Application of an appropriate linear transformation to the test data sample feature space mapping yields a feature space mapping which overlays the mapping of the training data sample set, regardless of data acquisition or other data set differences.)

Augmenting the feature space mapping of training data samples through the application of transformations, such as through the application of a D×D linear transformation matrix to the feature space mapping, expands the coverage of the mapped feature space and enhances the robustness of the model with regard to test data from different sources etc. differing from the training data set by a similar transformation matrix. Disclosed embodiments introduce augmentation not at the input layer, but much later and deeper in the CNN layers, just prior to the final classification layers.

In an embodiment, the method receives an input data set associated with the intended use of the trained model, e.g., a model intended for mammogram image analysis receives a set of historic mammogram images from one or more imaging devices and/or imaging centers. The received images constitute labeled data and include a characterization of the image in line with the desired characterizations of the trained model. For example, providing a model training data labeled as negative (no cancer found), benign (only benign elements found) or malignant (malignant cancerous elements found) enables the model to train a classifier capable of classifying new test images as one of the three training set labeled categories. The training data set may be augmented using geometric or scaling transformations as described above, or used without augmentation.

Using a machine learning model, such as a CNN, the method processes the training data images, reducing the millions of features associated with the pixels of the training images to a feature space associated with thousands of features. Graph 110, and accompanying key 120, of FIG. 1 provide a simplified illustration of a mapped feature space, according to an embodiment of the invention.

As shown in the figure, the feature space includes data points, each associated with negative results but derived from separate imaging centers and mapped differently by the CNN to the feature space. Similarly, the method maps malignant data points to different portions of the feature space. Such disparities in the mapping of similarly labeled data may yield a feature space having poor prediction results.

In an embodiment, the architecture of the overall machine learning model enables the extraction of the details of the initial or original feature space mapping associated with the training data set, e.g., the set of mammogram images from one or more imaging devices. The extracted feature mapping may not be interpretable by a human as it may still include thousands of dimensions in its most reduced or flattened form. The machine learning model generating the feature space is a deep convolutional neural network (CNN). A CNN consists of multiple convolution layers. Each convolution layer contains a number of convolution filters. Each filter is typically of a 2-dimensional shape-3×3, 5×5, or 7×7, and contains weights as learnable parameters. Other layers include batch normalization and pooling layers. Batch normalization layers apply a linear scaling factor to their input to prevent covariate shift. Pooling layers down-sample the incoming feature maps to reduce their 2-dimensional shape. A CNN includes sequential application of convolutional, batch normalization, and pooling layers that eventually produce a flattened vector which is the mapped feature space. The feature space is D-dimensional, where D is the dimensionality of the final feature map. Extraction of the mapped feature space enables the method to transform the feature space through the application of one or more linear transformations during the training process, such as D×D dimensional linear transformation matrix. The linear transformation matrix can be completely randomly generated during each pass of the backpropagation algorithm. Application of the matrix applies a linear transformation to the mapped data points of the feature space, shifting the locations of the data points in the mapped feature space in a linear fashion, resulting in a transformed mapping of the feature space. The method adds these transformed features to the training data batch along with the original features, and uses the combined set of features to train the dense layers that follow the CNN. The transformed features belong to all the classes, and adding the transformed features trains the network to distinguish between the features even in instances where feature class boundaries are different as in an unseen test dataset. In an embodiment, application of the linear transformation matrix reduces the dissimilarities in the mapping of similarly labeled data points to the extent that the mapping dissimilarities arise from data source artifacts and not from difference in actual features of interest in the data sample, e.g., the presence or absence of benign or malignant elements in a mammogram image.

Figure 2:
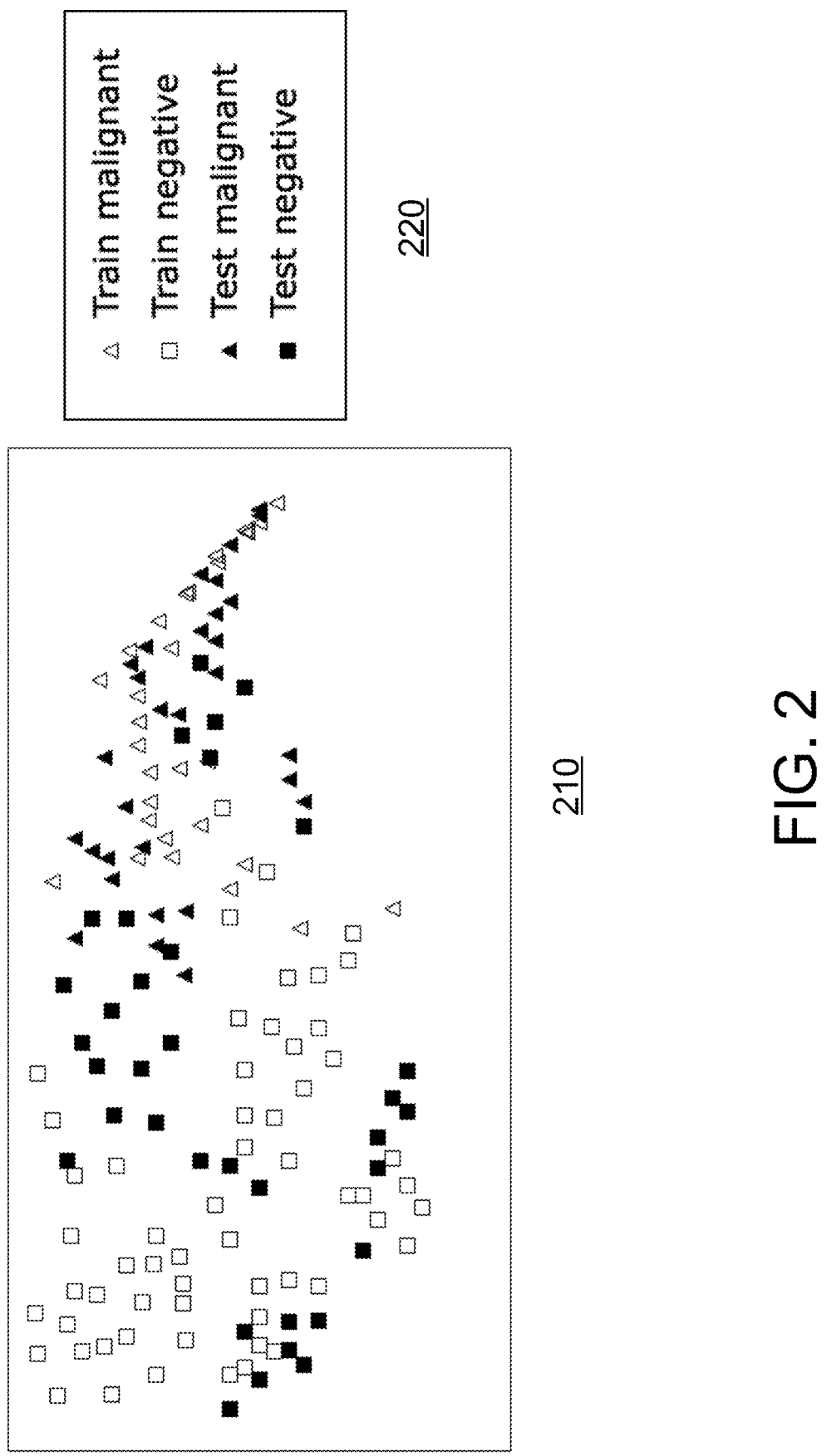
FIG. 2 depicts the original feature space data after a transformation, according to an embodiment of the invention.

Graph 210 and accompanying key 220, of FIG. 2 provides an illustration of the original feature space of FIG. 1, after the application of a transformation to the data mapped to the feature space. In an embodiment, the transformation includes the application of the D×D dimensional linear transformation matrix to the feature space data. Comparison of graphs 110 and 210 reveals an increase in the proximity of the locations of mapped negative data points, and also malignant data points in the transformed feature space.

In an embodiment, the method utilizes the labeled data of both the original feature space and the labeled data of the transformed feature space in training the dense, fully connected classifier layers of the overall model. The method trains the classifier using the original training data feature space mapping and the transformed feature space mapping. The resulting classifier tends to be more robust toward test data arising from different data sources than the training data set and differing from the training data set by a linear transformation.

In an embodiment, the architecture of the overall machine learning model enables the insertion of the transformed and original labeled feature spaces as the inputs to the final classifier layers of the model. In this embodiment, the final classifier model includes a sequence of dense layers. Typically, the CNN itself has a number of dense layers at its end to predict the final labels. In this embodiment, the final classifier refers to the set of dense layers that are trained along with the convolutional layers of the CNN. Each dense layer has a set of weights that can be represented by a matrix W. The input features $f_{in}$ are transformed by W to create a d dimensional output $f_{out}$, where d<D typically. The method applies a non-linear function such as rectified linear unit (ReLu) to $f_{out}$ and sends the results to the next dense layer. A final dense layer produces an output of dimensionality L, where L is the number of labels. In this embodiment, the method utilizes back propagation gradient descent to minimize a loss function associated with correctly classifying the labeled data from the original and transformed feature spaces of labeled data. During each training epoch the method classifies data points from the original and transformed feature spaces and derives a loss function value from the comparison of the current classification and the provided ground truth label of the data point. The method adjusts network node weights to minimize the loss function value, i.e., to move the current classification closer to the ground truth label classification. Training proceeds iteratively toward minimizing the overall set of loss function values associated with the set of labeled data points from the original and transformed feature spaces. In an embodiment, training stops when no further significant reduction in the loss function values for the set of labeled data points occurs.

The resulting trained machine learning model including the feature mapper, e.g., the CNN, and the dense model, e.g., the fully connected classifier, enables the classification of input images from not only the data sources associated with the training data set but also from data sources providing data samples shifted by a linear transformation from the training data set samples.

Figure 3:
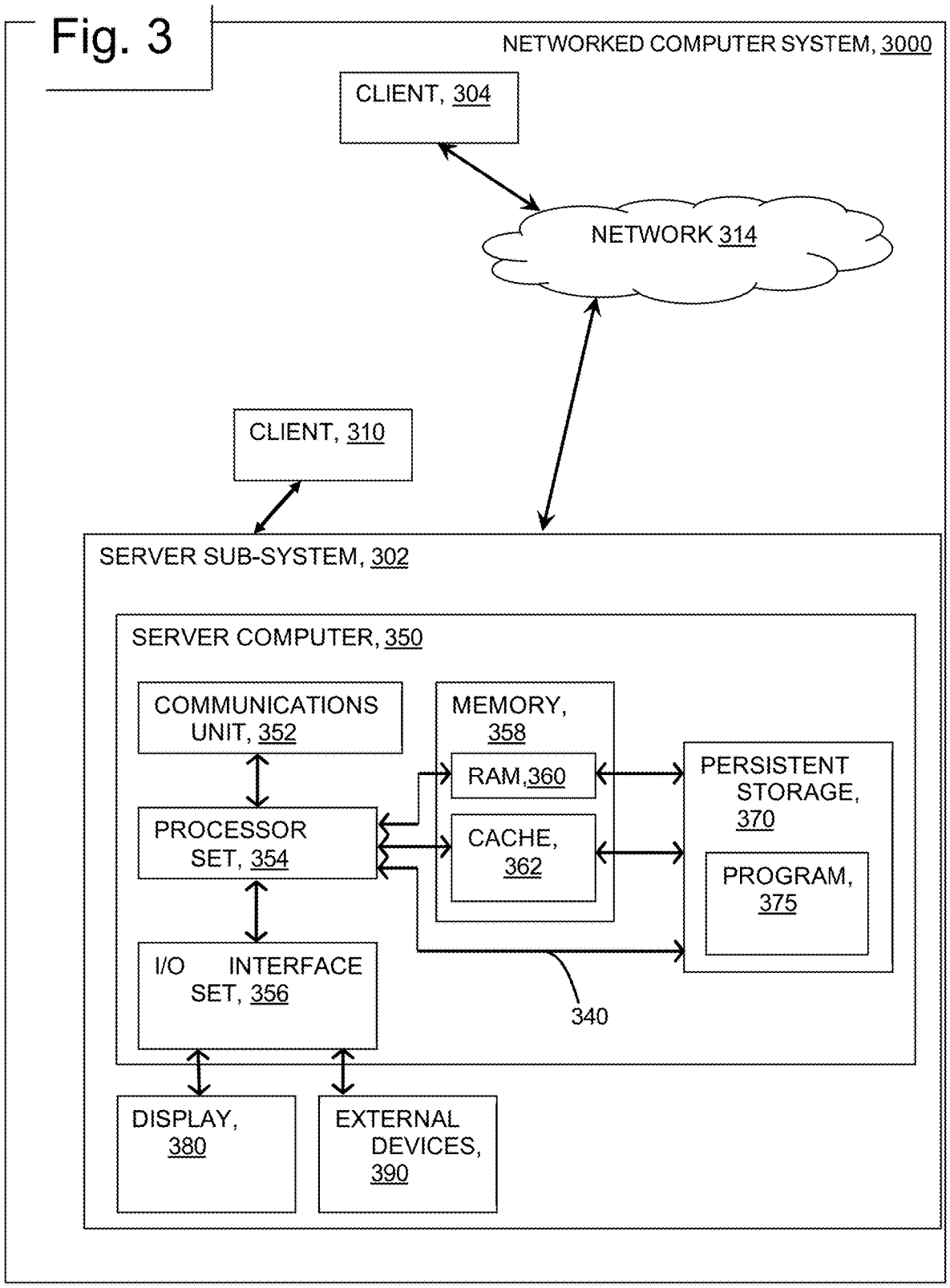
FIG. 3 provides a schematic illustration of a computing environment, according to an embodiment of the invention.

FIG. 3 provides a schematic illustration of exemplary network resources associated with practicing the disclosed inventions. The inventions may be practiced in the processors of any of the disclosed elements which process an instruction stream. As shown in the figure, a networked Client device 310 connects wirelessly to server sub-system 302. Client device 304 connects wirelessly to server sub-system 302 via network 314. Client devices 304 and 310 comprise application program (not shown) together with sufficient computing resource (processor, memory, network communications hardware) to execute the program. As shown in FIG. 3, server sub-system 302 comprises a server computer 350. FIG. 3 depicts a block diagram of components of server computer 350 within a networked computer system 3000, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 350 can include processor(s) 354, memory 358, persistent storage 370, communications unit 352, input/output (I/O) interface(s) 356 and communications fabric 340. Communications fabric 340 provides communications between cache 362, memory 358, persistent storage 370, communications unit 352, and input/output (I/O) interface(s) 356. Communications fabric 340 can be implemented with any architecture designed for passing data and/or control information between processors (such as microprocessors, communications and network processors, etc.), system memory, peripheral devices, and any other hardware components within a system. For example, communications fabric 340 can be implemented with one or more buses.

Memory 358 and persistent storage 370 are computer readable storage media. In this embodiment, memory 358 includes random access memory (RAM) 360. In general, memory 358 can include any suitable volatile or non-volatile computer readable storage media. Cache 362 is a fast memory that enhances the performance of processor(s) 354 by holding recently accessed data, and data near recently accessed data, from memory 358.

Program instructions and data used to practice embodiments of the present invention, e.g., the image classifying program 375, are stored in persistent storage 370 for execution and/or access by one or more of the respective processor(s) 354 of server computer 350 via cache 362. In this embodiment, persistent storage 370 includes a magnetic hard disk drive. Alternatively, or in addition to a magnetic hard disk drive, persistent storage 370 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 370 may also be removable. For example, a removable hard drive may be used for persistent storage 370. Other examples include optical and magnetic disks, thumb drives, and smart cards that are inserted into a drive for transfer onto another computer readable storage medium that is also part of persistent storage 370.

Communications unit 352, in these examples, provides for communications with other data processing systems or devices, including resources of client computing devices 304, and 310. In these examples, communications unit 352 includes one or more network interface cards. Communications unit 352 may provide communications through the use of either or both physical and wireless communications links. Software distribution programs, and other programs and data used for implementation of the present invention, may be downloaded to persistent storage 370 of server computer 350 through communications unit 352.

I/O interface(s) 356 allows for input and output of data with other devices that may be connected to server computer 350. For example, I/O interface(s) 356 may provide a connection to external device(s) 390 such as a keyboard, a keypad, a touch screen, a microphone, a digital camera, and/or some other suitable input device. External device(s) 390 can also include portable computer readable storage media such as, for example, thumb drives, portable optical or magnetic disks, and memory cards. Software and data used to practice embodiments of the present invention, e.g., image classifying program 375 on server computer 350, can be stored on such portable computer readable storage media and can be loaded onto persistent storage 370 via I/O interface(s) 356. I/O interface(s) 356 also connect to a display 380.

Display 380 provides a mechanism to display data to a user and may be, for example, a computer monitor. Display 380 can also function as a touch screen, such as a display of a tablet computer.

Figure 4:
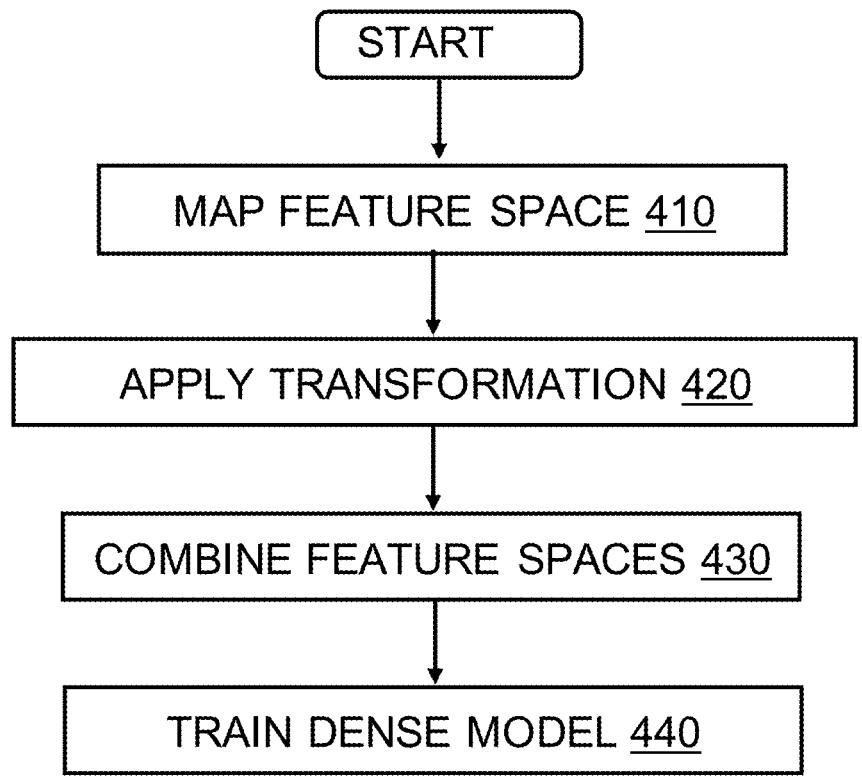
FIG. 4 provides a flowchart depicting an operational sequence, according to an embodiment of the invention.

FIG. 4 provides a flowchart 400, illustrating exemplary activities associated with the practice of the disclosure. After program start, at block 410, the method of image classifying program 375 receives an input data set for training the model. The input data resembles the test data the model will be used to classify after training. The method maps the input training data set to a reduced dimensionality feature space using a machine learning model such as a convolutional neural network, or other dimension reducing model.

In an embodiment, the design of the overall machine learning model enables extraction of the mapped feature space associated with the training data set prior to passing the mapped feature set off to the dense model classifier. The method provides the mapped feature space from the CNN as an interim output. The machine learning model is further configured to enable the submission of the original and transformed feature spaces described below, to the dense model in place of the original mapped feature space from the CNN.

At block 420, the method of image processing program 375 applies a transformation to the mapped feature space of the training data set. The application yields a linearly transformed version of the original feature space. The transformed version relates to the application of a linear transformation to test data having feature mapping outside or substantially different to the training data set mapping.

At block 430, the method combines the original feature space mapping and the transformed feature space mapping. Including random linear transformations of the original data feature space mapping increases the robustness of the final model with regard to test data separated from the training data set by a linear transformation, such as test data arising from a different data source, e.g., a different medical imaging device.

At block 440, the method provides the labeled data of the original feature space mapping and the labeled data of the transformed feature space mapping as inputs to the dense model portion of the overall machine learning model. The dense model comprises fully connected deep learning network layers applied as a classifier of features mapped in the feature space. The dense model defines boundaries among labeled training data set points mapped in the original and transformed feature spaces. In an embodiment, the method uses back propagation gradient descent to minimize the loss function associated with classifying labeled data points from the original and transformed feature spaces, to derive network node weightings for the dense model classifier. The resulting trained dense model embodies the capability to classify new test data mapped to the original or transformed feature spaces.

In an embodiment, the method provides the trained CNN plus dense classifier built using the original and transformed feature spaces for use by a user in classifying new test data such as new mammogram images from imaging sites associated with and also outside the set of imaging sites where the training data set originated. In this embodiment, the user provides an image such as a mammogram as input to the CNN. The CNN maps the features of the new image to the original and transformed feature spaces and passes the mapping of the features to the trained dense model. The trained dense model classifies the mapped features according to the node weights derived using the training data set labels during the training phase of the method.

Though the method has been described using mammogram images as an example, applications of the method are not limited to mammogram classification. The method may be used to train models for other medical diagnostic imaging analyses tasks as well as the analysis of other images and also other large data sets having millions of features and benefiting from dimensionality reduction as accomplished by the method. The method may be beneficially applied to classification tasks where achieving robustness across a broad range of input data sources beyond the benefits available through augmenting the training data set by geometric or scaling transformations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
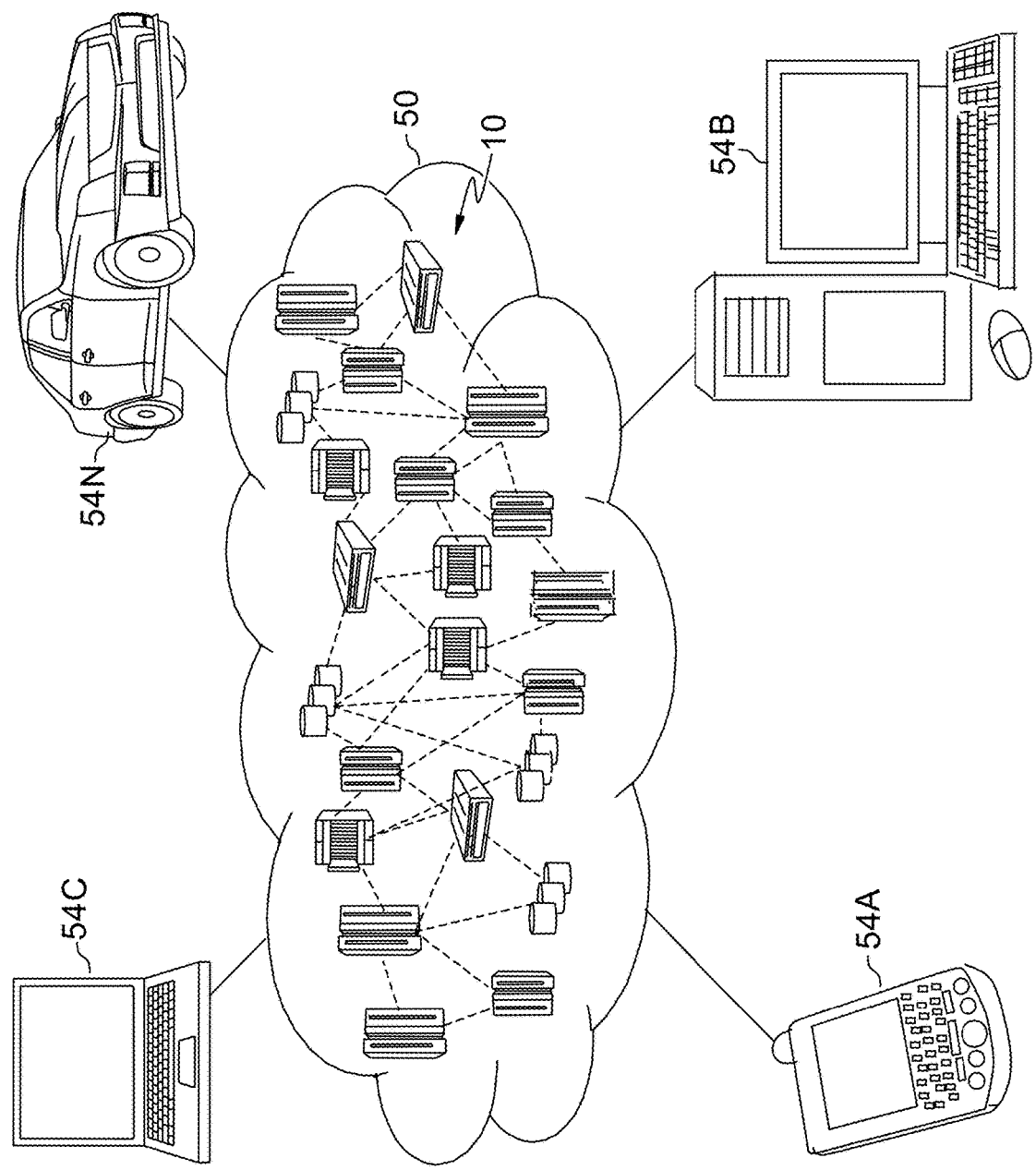
FIG. 5 depicts a cloud computing environment, according to an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
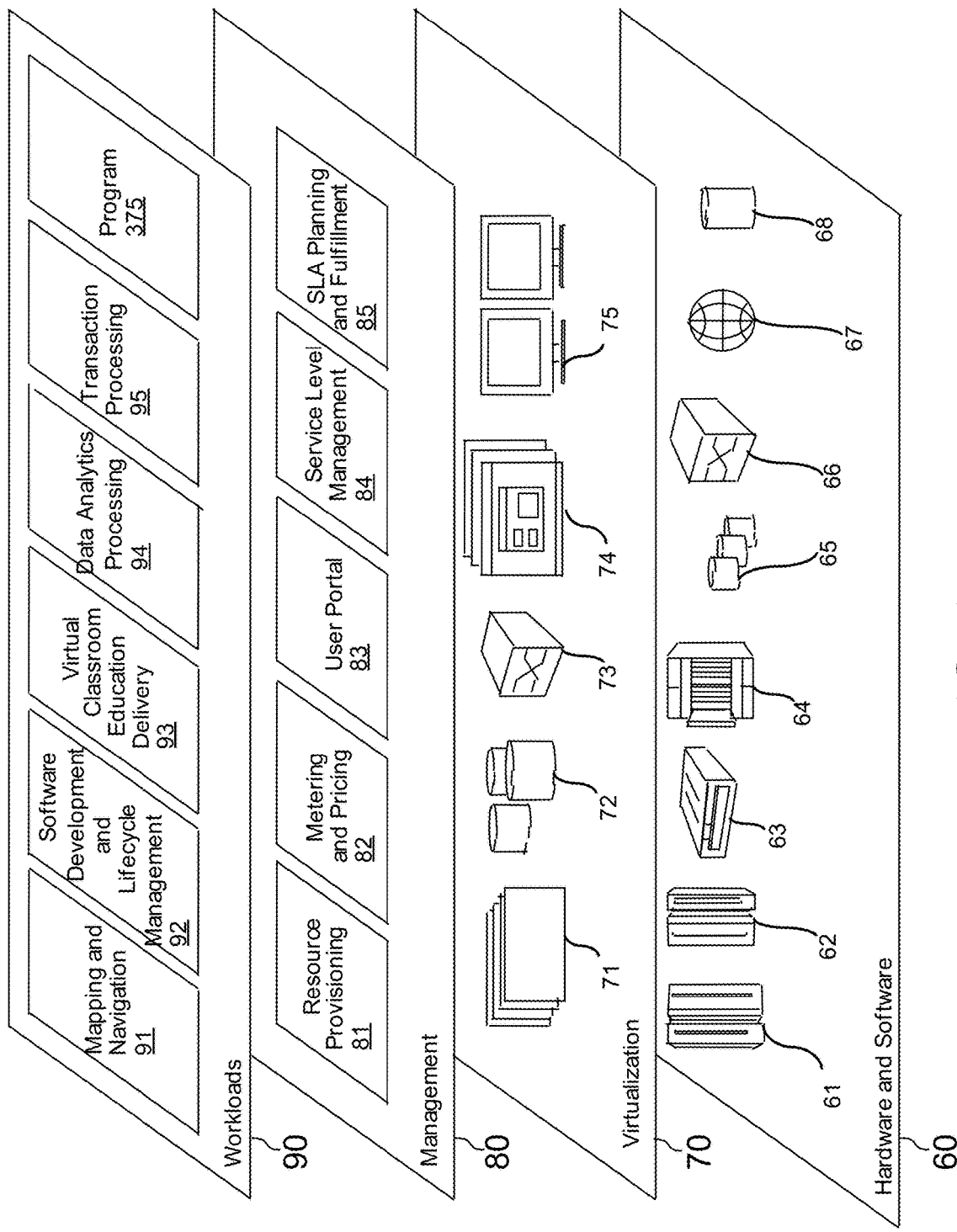
FIG. 6 depicts abstraction model layers, according to an embodiment of the invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image classifying program 375.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for training a robust machine learning model, the method comprising:
    mapping, by one or more computer processors, an input data set to a first feature space;
    applying, by the one or more computer processors, a linear transformation to the first feature space, yielding a second feature space; and
    training, by the one or more computer processors, a dense model using the first feature space and the second feature space.

2. The computer implemented method according to claim 1, wherein the dense model comprises a classifier.

3. The computer implemented method according to claim 1, wherein mapping the input data to a feature space comprises mapping the input data with a convolutional neural network.

4. The computer implemented method according to claim 1, wherein the dense model classifies image features.

5. The computer implemented method according to claim 1, wherein the input data set comprises medical diagnostic images.

6. The computer implemented method according to claim 1, wherein applying a transformation to the first feature space comprises applying a linear transformation matrix to the first feature space.

7. The computer implemented method according to claim 1, further comprising providing, by the one or more computer processors, a trained model configured to classify input data.

8. A computer program product for training a robust machine learning model, the computer program product comprising one or more computer readable storage devices and collectively stored program instructions on the one or more computer readable storage devices, the stored program instructions comprising:
    program instructions to map an input data set to a first feature space;
    program instructions to apply a linear transformation to the first feature space, yielding a second feature space; and
    program instructions to train a dense model using the first feature space and the second feature space.

9. The computer program product according to claim 8, wherein the dense model comprises a classifier.

10. The computer program product according to claim 8, the stored program instructions further comprising program instructions to map the input data to a feature space with a convolutional neural network.

11. The computer program product according to claim 8, the stored program instructions further comprising program instructions to classify image features.

12. The computer program product according to claim 8, wherein the input data comprises medical diagnostic images.

13. The computer program product according to claim 8, wherein the stored program instructions to apply a transformation to the first feature space comprise program instructions to apply a linear transformation matrix to the first feature space.

14. The computer program product according to claim 8, the stored program instructions further comprising program instructions to provide a trained model configured to classify input data.

15. A computer system for training a robust machine learning model, the computer system comprising:
    one or more computer processors;
    one or more computer readable storage devices; and
    stored program instructions on the one or more computer readable storage devices for execution by the one or more computer processors, the stored program instructions comprising:
        program instructions to map an input data set to a first feature space;
        program instructions to apply a linear transformation to the first feature space, yielding a second feature space; and
        program instructions to train a dense model using the first feature space and the second feature space.

16. The computer system according to claim 15, the stored program instructions further comprising program instructions to map the input data to a feature space with a convolutional neural network.

17. The computer system according to claim 15, the stored program instructions further comprising program instructions to classify image features.

18. The computer system according to claim 15, wherein the input data comprises medical diagnostic images.

19. The computer system according to claim 15, wherein the stored program instructions to apply a transformation to the first feature space comprise program instructions to apply a linear transformation matrix to the first feature space.

20. The computer system according to claim 15, the stored program instructions further comprising program instructions to provide a trained model configured to classify input data.

* * * * *